United States Patent [19]

Swanson

[11] 4,072,950
[45] Feb. 7, 1978

[54] LF/MF NAVIGATION SYSTEM

[76] Inventor: Eric R. Swanson, 640 Silvergate Ave., San Diego, Calif. 92106

[21] Appl. No.: 722,456

[22] Filed: Sept. 13, 1976

[51] Int. Cl.² .............................................. G01S 1/30
[52] U.S. Cl. ................................................ 343/105 R
[58] Field of Search .................................... 343/105 R

[56] References Cited

U.S. PATENT DOCUMENTS

| 3,883,874 | 5/1975 | Swanson | 343/105 R |
| 3,889,264 | 6/1975 | Fletcher | 343/105 R |
| 3,928,852 | 12/1975 | Barker | 343/105 R |

OTHER PUBLICATIONS

H.O. Publication No. 220, U.S. Navy Hydrographic office, 1963, p. 175.

Primary Examiner—Maynard R. Wilbur
Assistant Examiner—Richard E. Berger
Attorney, Agent, or Firm—R. S. Sciascia; G. J. Rubens; T. M. Phillips

[57] ABSTRACT

A navigation aid comprises two transmitters transmitting signals in the LF/MF range (250 kilohertz–490 kilohertz) and a receiver indicator for receiving each of the transmitted signals, translating them to a common frequency, and indicating the phase difference at any given position. Frequency stablizing means are coupled to each transmitter to stabilize the frequency of each transmitted signal and to prevent the differential frequency error from exceeding a selected limit.

12 Claims, 5 Drawing Figures

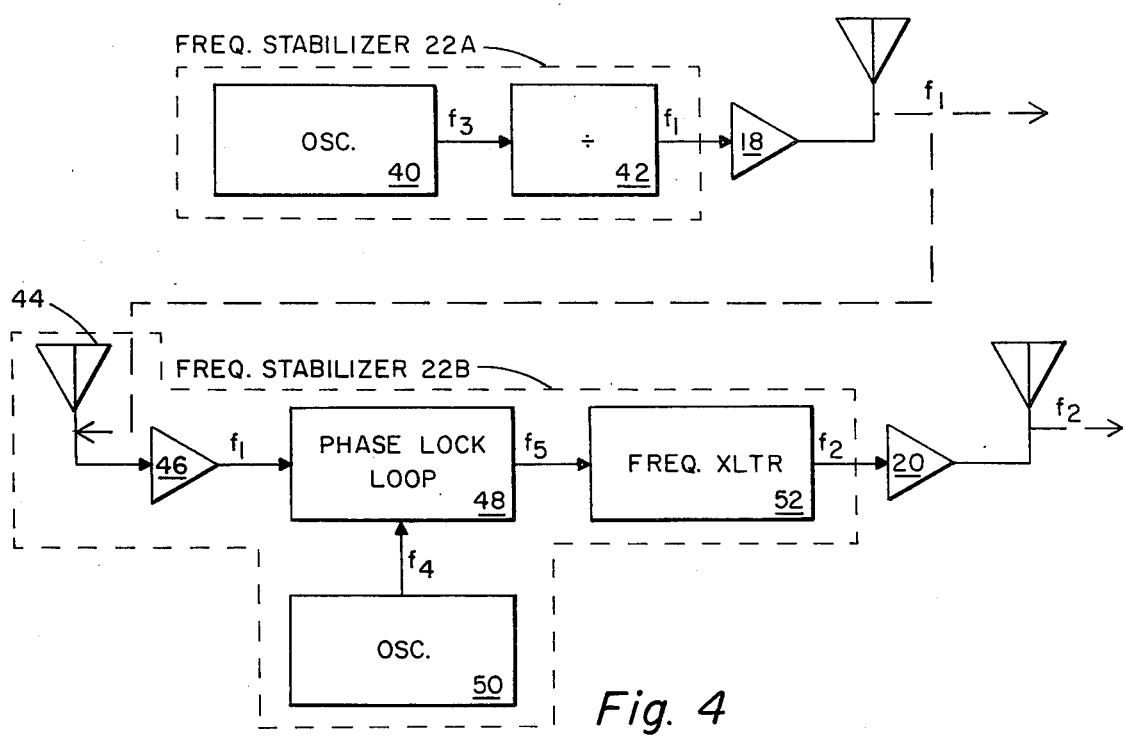
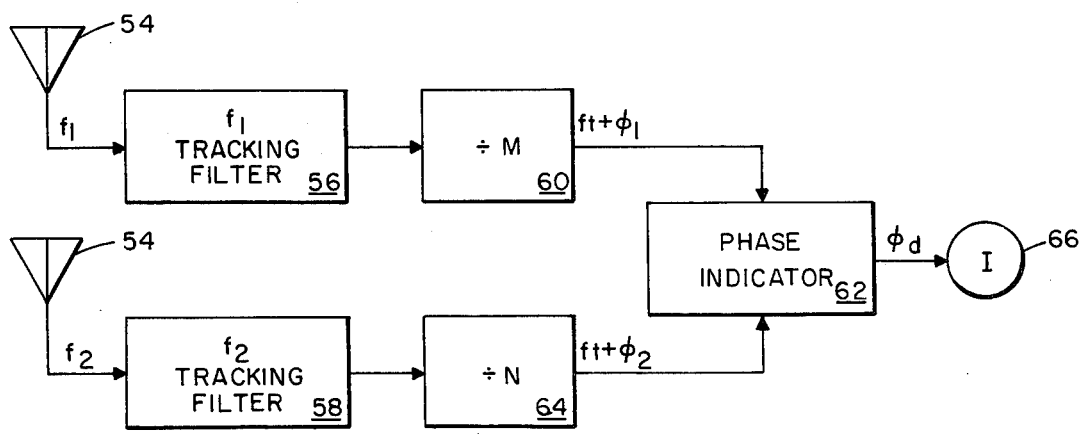
Fig. 4
Fig. 5

LF/MF NAVIGATION SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention pertains to a navigation system employing signals in the LF/MF range, and particularly to such navigation system wherein LF/MF transmitters are frequency stabilized to allow navigation by phase differential techniques.

Presently, RDF (Radio Direction Finder) receivers are used in coastal water craft, or other vehicles, to provide an inexpensive means for determining position. An RDF receiver is capable of determining the bearings from the craft to geographically separated radiobeacon transmitters, and the position of the craft may be determined by plotting the intersections of the back azimuths of the bearings on an accurate chart, each of the back azimuths comprising LOP (Line of Position).

For certain applications, for example, for navigating through a narrow strait or to locate a fishing hole, a water craft may require a more accurate means of navigating than is provided by an RDF receiver but which is still relatively inexpensive. Such means could comprise a receiver capable of receiving a signal from each of two radiobeacon transmitters and of indicating which hyperbolic line of the hyperbolic phase grid constructed by the two signals the craft is on by computing their phase difference. If the signals have different frequencies, they must be translated to a common frequency f in order to determine the difference between their phase angles. Navigation systems based on hyperbolic phase grids are of course well-known for frequencies in the VLF range (3–30 kilohertz). However, present radiobeacon transmitters transmit in the LF/MF range (250 kilohertz-490 kilohertz) with relatively low frequency stability. Consequently, the differential frequency error, $\Delta f/f$, the difference between the actual translated values of the transmitted signals, may exceed $10^{-5}$. With an error of this magnitude, positional error will accumulate at the rate of one mile/second, which may prevent the system from providing useful accuracy.

SUMMARY OF THE INVENTION

In the present invention means are provided for mutually stabilizing the frequencies of two signals, $f_1$ and $f_2$, transmitted in the LF/MF range, which may be translated to a common frequency f with sufficient precision that $\Delta f/f$ may be kept within a selected limit, for example, $\Delta f/f < 10^{-12}$. If $\Delta f/f$ is less than $10^{-10}$, positional error will accumulate to less than about 500 feet in three hours. The invention further provides a receiver indicator for indicating the hyperbolic phase line of the hyperbolic phase grid constructed by signals $f_1$ and $f_2$ the receiver is on at a given time by receiving signals $f_1$ and $f_2$ and computing the phase difference, $\phi d$, a particular value of $\phi d$ having a known correspondence to a particular hyperbolic phase line of the grid. Some embodiments of the invention may be employed with existing radiobeacon transmitters to provide a navigation system which may be useful for navigating in coastal areas, although other embodiments of the invention may be employed in other ways and for other purposes.

The cost of a suitable receiver indicator useful for coastal navigation may be nearly competitive to the cost of an RDF receiver, and a navigation system employing the principles of the present invention may improve sensitivity and accuracy over present RDF systems. Presently, an RDF system may provide an LOP accuracy of about 1 mile at a 60 mile range (0 bearing accuracy) whereas an embodiment of the present invention will provide an LOP resolution of about 20 feet.

In some embodiments of the invention $\Delta f/f$ may be kept within a selected limit by coupling frequency stabilizing means to each of two transmitters transmitting signals $f_1$ and $f_2$ having errors $\Delta f_1$ and $\Delta f_2$, respectively, whereby $\Delta f_1/f_1$ and $\Delta f_2/f_2$ are also within the selected limit.

Alternatively, transmitters transmitting signals $f_1$ and $f_2$ may have a master-slave relationship whereby $\Delta f_1$ and $\Delta f_2$ will be directly proportional so that the frequency errors of their respective translated frequencies will cancel out when the receiver indicator computes phase difference $\phi d$.

As a further alternative the transmitters transmitting signals $f_1$ and $f_2$ may both be synchronized to an external source whereby the differential frequency error remains less than a selected limit in such a way that accumulated epoch error between transmitters remains less than a selected limit.

If three radiobeacon transmitters generate mutually stabilized signals the craft may fix its position as well as determine its LOP from the inersection of two of the hyperbolic phase grids constructed by the three transmitted signals.

STATEMENT OF THE OBJECTS OF THE INVENTION

An object of the invention is to provide an improved means for mutually stabilizing different signals in the LF/MF range.

Another object is to provide an improved navigation system employing a hyperbolic phase grid constructed from mutually stabilized signals in the LF/MF range.

Another object is to provide a new and improved navigation system which may employ existing radiobeacon transmitters.

Other objects, advantages and novel features of the invention will become apparent from the following detailed description of the invention when considered in conjunction with the accompanying drawings.

BRIEF DESCRIPTION OF THE DRAWINGS

FIG. 4 is a block diagram showing a third manner of the frequency stabilizers of the embodiment of FIG. 1.

FIG. 5 is a block diagram showing a receiving indicator of the embodment of FIG. 1.

DESCRIPTION OF THE PREFERRED EMBODIMENT

Figure 1:
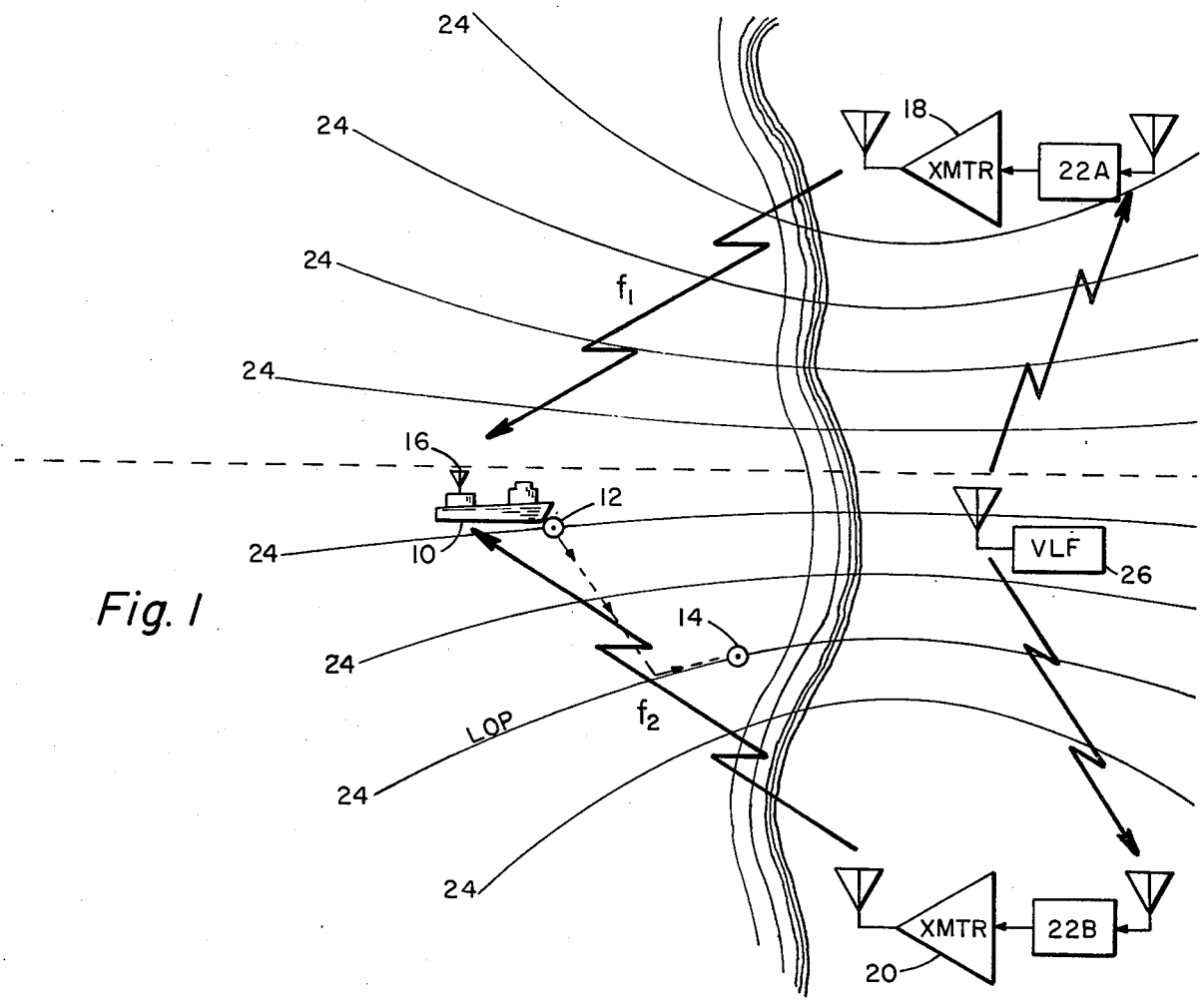
FIG. 1 is a symbolic illustration showing an embodiment of the invention.

FIG. 1 shows water craft 10 at a known initial position 12 which seeks to move to another position 14, wherein position 14 may be readily determinable when craft 10 comes within close proximity. Craft 10 is provided with receiver indicator 16 which is capable of receiving signals $f_1$ and $f_2$, respectively, and of indicating the derived difference between their phase angles, $\phi_d$, at any given position, for example, by deflecting a needle on a graduated display device or by means of a digital counter which counts cycle differences in the hyperbolic lane following an initialization. To determine $\phi_d$, receiver indicator 16 translates $f_1$ to a frequency $f + \Delta f_{t1}$ and $f_2$ to a frequency $f + \Delta f_{t2}$ wherein $f$ is a common frequency and $f = f_1/M = f_2 N$, M, N being integers, $\Delta f_{t1}$ and $\Delta f_{t2}$ are residual frequency errors, and $\Delta f/f = \Delta f_{t1} - \Delta f_{t2}/f$, $\Delta f/f$ being a fractional differential frequency error. Signals $f_1$ and $f_2$ are signals in the LF/MF range (250 KHz–490 KHz), $f_1$ having a nominal value, for example, of 345 KHz, and $f_2$ having a nominal value of 380 KHz. Signals $f_1$ and $f_2$ are transmitted by transmitters 18 and 20, respectively, which are situated at fixed locations and may comprise existing radiobeacon transmitters. Transmitters 18 and 20 are provided with frequency stabilizers 22A and 22B, respectively, which function to prevent $\Delta f/f$ from exceeding a selected limit, which may be as low as $10^{-12}$.

According to principles well known in navigation systems using VLF waves, $f_1/M$ and $f_2/N$ construct a hyperbolic phase grid having its axes at the locations of transmitters 18 and 20, wherein each hyperbolic phase line 24 is the locus of points for which $\phi_d$ has a particular value. To navigate from position 12 to position 14 according to the present invention, a chart illustrating the hyperbolic phase grid may be consulted to determine the values of $\phi_d$ corresponding to the hyperbolic phase lines passing through locations 12 and 14, respectively, the line passing through position 14 comprising the LOP for the navigation. The value of $\phi_d$ of the line passing through position 12 may be used to initialize receiver indicator 16, and craft 10 may set a course, for example by following a compass, until receiver indicator 16 shows the value of $\phi_d$ corresponding to the LOP. The craft may then follow the LOP until it reaches position 14.

In an embodiment of the invention, frequency stabilizers 22A and 22B may have means for receiving a VLF signal from VLF source 26 for purposes of frequency stabilization in a manner to be described.

Figure 2:
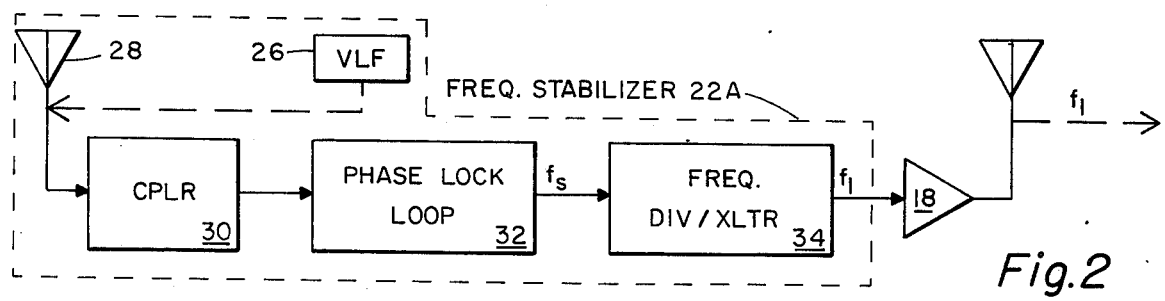
FIG. 2 is a block diagram showing a first manner of the frequency stabilizers of the embodiment of FIG. 1.

Referring to FIG. 2, there is shown an LF/MF transmitter 18 receiving a highly stabilized signal $f_1$ from a first manner of frequency stabilizer 22A wherein the possible error $\Delta f_1/f_1$ is less than $10^{-10}$. Receiving antenna 28 is provided to receive a VLF signal from VLF source 26 which is coupled through antenna coupler 30 into phase lock loop 32. Phase lock loop 32 may be a device capable of processing a received VLF signal and is provided with an oscillator which generates a signal having a nominal frequency. The oscillator and VLF signals comprise the inputs to a circuit which provides a standard frequency output, $f_s$, where $f_s$ is a highly stabilized signal equal to the nominal value of oscillator signal frequency. The output $f_s$ is coupled through frequency divider/translator 34 to provide a signal to transmitter 18 having frequency $f_1$ and the desired degree of stability.

A suitable phase lock loop 32 may comprise a modification of the invention disclosed in my U.S. Pat. No. 3,883,874, "System for Providing a Reference Frequency Source," issued May 13, 1975.

In addition to employing a VLF signal from a particular source to serve as reference for generating a stabilized signal $f_1$, a modification of the apparatus of FIG. 2 may employ a plurality of randomly received VLF signals to provide a stabilized signal.

Frequency stabilizer 22B may comprise an apparatus similar to the apparatus shown in FIG. 2.

Figure 3:
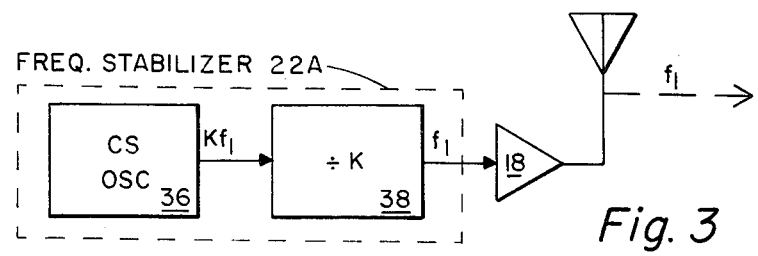
FIG. 3 is a block diagram showing a second manner of the frequency stabilizers of the embodiment of FIG. 1.

Referring to FIG. 3 there is shown an LF/MF transmitter 18 receiving a highly stabilized signal $f_1$ from a second manner of frequency stabilizer 22A. Cesium oscillator 36 is a well-known device which is capable of providing a signal $Kf_1$ of very high stability, the signal being stabilized to within $10^{-12}$ of its nominal value, wherein K is an integer. By coupling $Kf_1$ through divider 38, a suitably stabilized signal $f_1$ may be coupled to transmitter 18.

Frequency stabilizer 22B may comprise an apparatus similar to the apparatus shown in FIG. 3.

Referring to FIG. 4, there are shown LF/MF transmitters 18 and 20 receiving signals $f_1$ and $f_2$ from a third manner of frequency stabilizers 22A and 22B, respectively, wherein frequency stabilizer 22A functions in a master relationship and frequency stabilizer 22B functions in a slave relationship. Positional oscillator 40 couples a signal of nominal frequency $f_3$ through divider 42 to provide a signal having nominal frequency $f_1$, which is transmitted by transmitter 18. The transmitted signal $f_1$ may be quite unstable, e.g., $\Delta f_1/f_1$ may be greater than $10^{-5}$. Receiving antenna 44 receives the unstable signal $f_1$ and couples it through amplifier 46 into phase lock loop 48, which may be any one of a number of well-known circuits. Phase lock loop 48 also receives a signal having nominal value $f_4$ from oscillator 50 which is locked to the phase of $f_1$ received through antenna 44. Consequently, the output of phase lock loop 48 is a signal $f_5$, which has an error $\Delta f_5$ directly proportional to $\Delta f_1$ and which is coupled through frequency translator 52 to provide a signal $f_2$, wherein $\Delta f_2$ is directly proportional to $\Delta f_1$. Consequently, when the signals $f_1$ and $f_2$ are received by receiver indicator 16 and translated to common frequency $f$ their respective errors will be cancelled out.

Referring to FIG. 5 there is shown a circuit which may comprise a receiver indicator 16 wherein one of the antennas 54 is tuned to receive a signal $f_1$ and the other is tuned to receive a signal $f_2$. The signal $f_1$ is coupled into $f_1$ tracking filter 56, which may be a well-known device, wherein the output of the tracking filter 56 is a signal having the form $[E \sin 2\pi(t-d_1)]/T$, $d_1$ being the phase angle of $f_1$ in time units. Similarly, single $f_2$ may be coupled into $f_2$ tracking filter 58 to provide a signal $[E \sin 2\pi(t-d_2)]/T$, $d_2$ being the phase angle of $f_2$ in time units. The output of tracking filter 56 is coupled into divider 60 and divided by M so that a signal of frequency $f + \Delta f_{t1}$ and phase angle $\phi_1$ is coupled to one of the input terminals of phase indicator 62. The output of tracking filter 58 is similarly coupled into divider 64 and divided by N so that a signal of frequency $f + \Delta f_{t2}$ and phase angle $\phi_d$ is coupled to the other input terminal of phase indicator 62. With sufficient frequency stability, $\Delta f_{t1}$ and $\Delta f_{t2}$ are negligible. Phase indicator 62, which may be any one of a number of well-known phase comparing devices, determines $\phi_d$ wherein $\phi_d = |\phi_1 - \phi_2|$ and couples a signal to display device 66.

Obviously many modifications and variations of the present invention are possible in the light of the above teachings. It is therefore to be understood that within the scope of the appended claims the invention may be practiced otherwise than as specifically described.

What is claimed is:

1. Apparatus for a navigation system employing a hyperbolic phase grid, said apparatus comprising:
   a. means for transmitting a plurality of signals having different frequencies in the LF/MF range each of said signals being transmitted from a different and known location;
   b. receiver indicator means receiving a first and a second of said transmitted signals for translating said first signal from its transmitted frequency to a first frequency comprising the sum of a common frequency and a first residual frequency error, for translating said second signal from its transmitted frequency to a second frequency comprising the sum of said common frequency and a second residual frequency error, and for indicating the phase difference between said first and second signals, the quotient of the absolute value of the difference between said first residual frequency error and said second residual frequency error and said common frequency not exceeding a selected limit.

2. The apparatus of claim 1 wherein each of said transmitting means comprises a frequency stabilizer means for providing one of said transmitted signals and a transmitter coupled to said frequency stabilizer means for transmitting said one of said transmitted signals.

3. The apparatus of claim 2 wherein the transmitted signal provided by each of said frequency stabilizer means has a frequency error that does not exceed said selected limit.

4. The apparatus of claim 3 wherein each of said frequency stabilizer means is provided with means for receiving a signal having a frequency in the VLF range.

5. The apparatus of claim 4 wherein each of said frequency stabilizer means is provided with means for receiving a plurality of random signals in the VLF range.

6. The apparatus of claim 4 wherein each of said frequency stabilizer means employs a first phase lock loop means.

7. The apparatus of claim 3 wherein each of said frequency stabilizer means is provided with a precision oscillator means for providing a signal having a frequency error that does not exceed said selected limit.

8. The apparatus of claim 7 wherein said precision oscillator means comprises a cesium oscillator.

9. The apparatus of claim 2 wherein the frequency stabilizer means of the transmitting means transmitting said second signal is provided with means for receiving and slaving on said first signal.

10. The apparatus of claim 9 wherein the transmitting means for transmitting said second signal is further provided with a second phase lock loop means, positional oscillator means, and frequency translation means for providing said second signal wherein the frequency error of said second signal is proportional to the frequency error of said first signal.

11. The apparatus of claim 2 wherein each of said transmitters comprises a radiobeacon and each of said receiver indicator means may be carried aboard a water craft.

12. The apparatus of claim 11 wherein said selected limit may be as low as $10^{-12}$.

* * * * *